L. JONES.
SHEAR MECHANISM.
APPLICATION FILED OCT. 11, 1918.

1,312,182.

Patented Aug. 5, 1919.
6 SHEETS—SHEET 1.

WITNESSES

INVENTOR

L. JONES.
SHEAR MECHANISM.
APPLICATION FILED OCT. 11, 1918.

1,312,182.

Patented Aug. 5, 1919.
6 SHEETS—SHEET 2.

WITNESSES
R. A. Balderson
G. B. Fleming

INVENTOR
Lloyd Jones

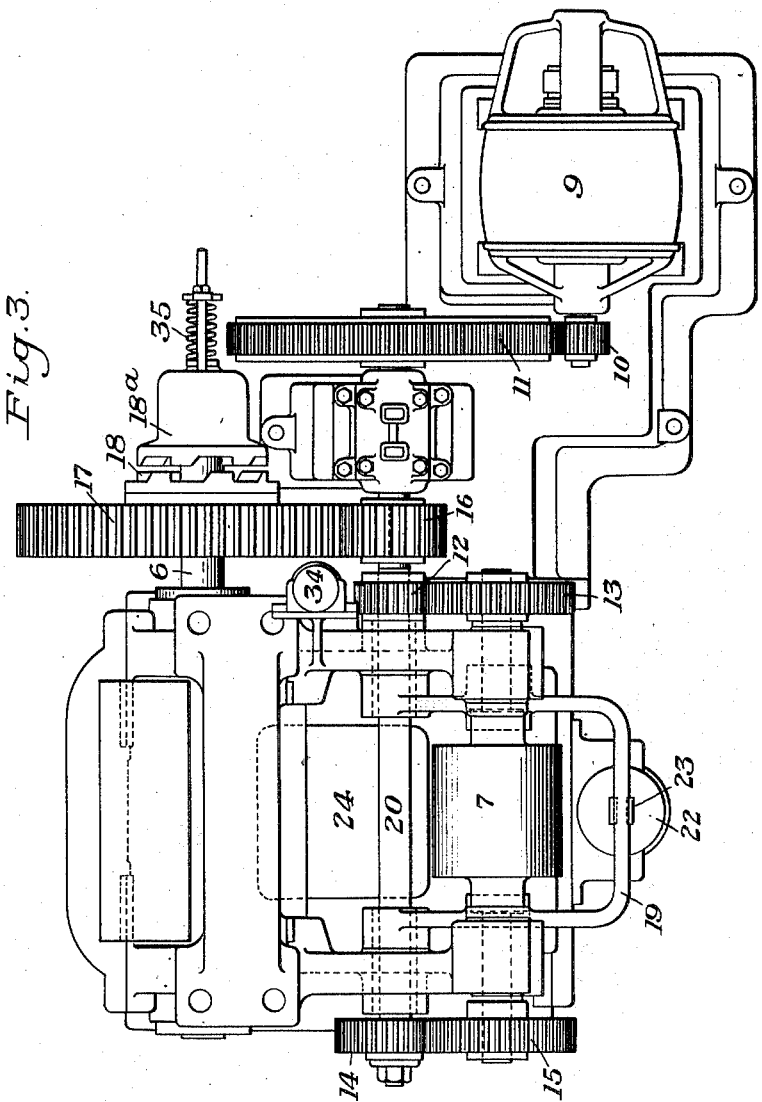

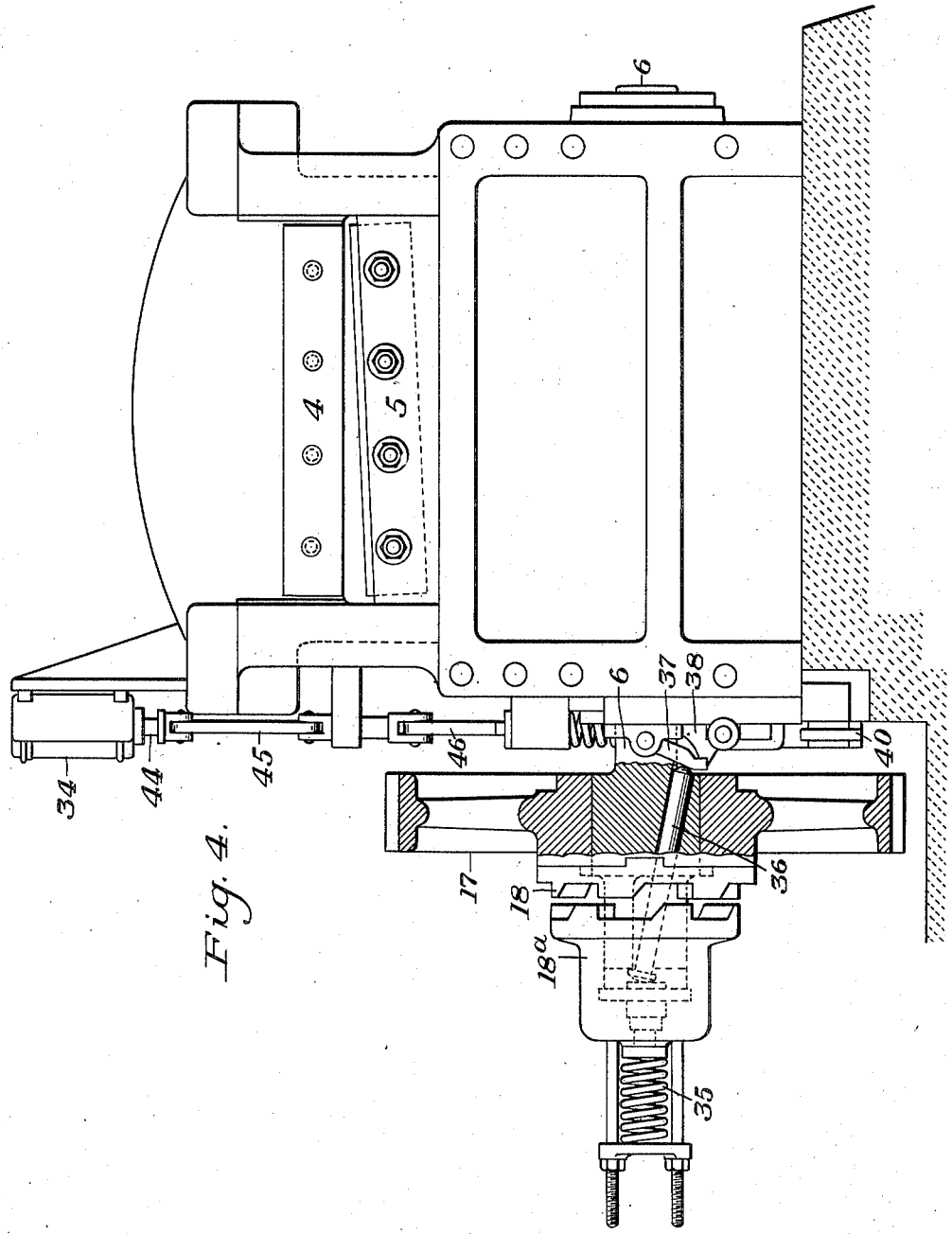

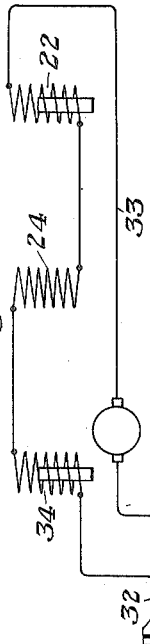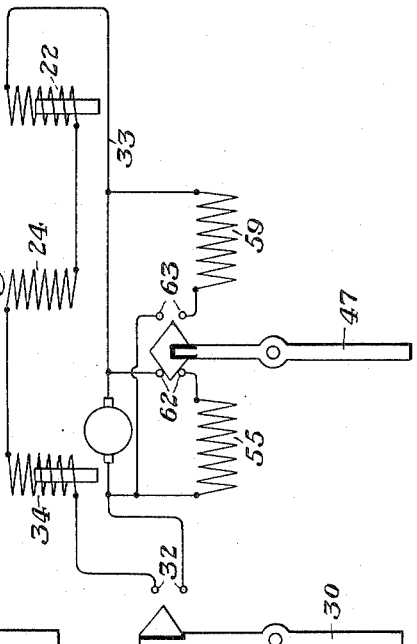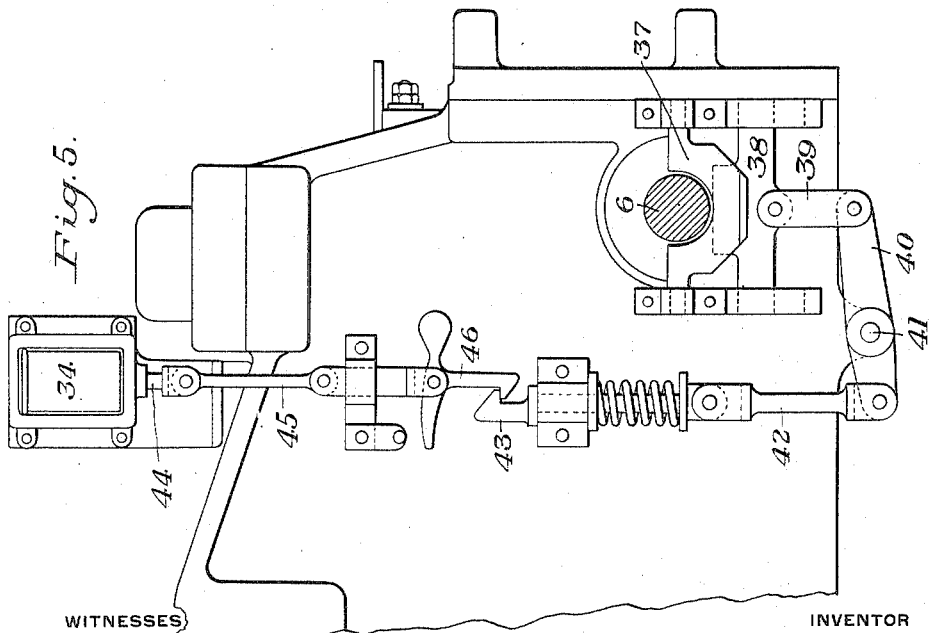

L. JONES.
SHEAR MECHANISM.
APPLICATION FILED OCT. 11, 1918.
1,312,182.
Patented Aug. 5, 1919.
6 SHEETS—SHEET 6.
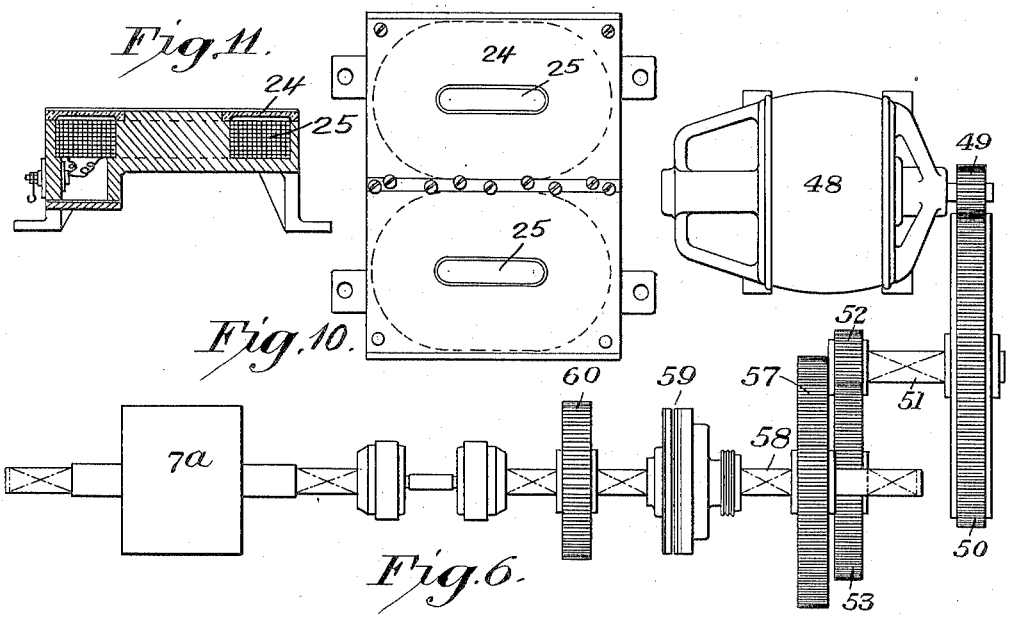
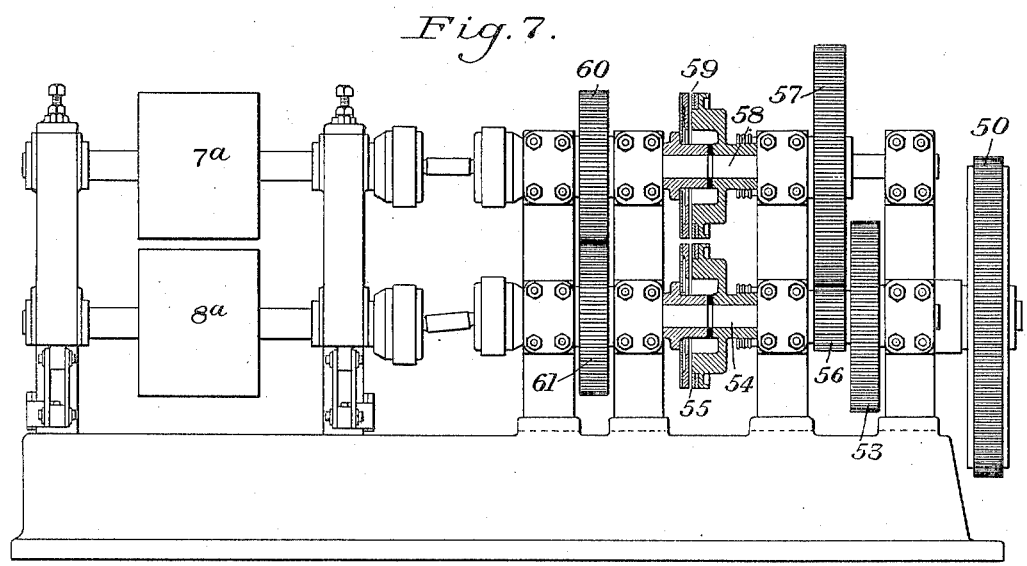
WITNESSES
INVENTOR
Lloyd Jones

UNITED STATES PATENT OFFICE.

LLOYD JONES, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

SHEAR MECHANISM.

1,312,182.     Specification of Letters Patent.     Patented Aug. 5, 1919.

Application filed October 11, 1918. Serial No. 257,803.

*To all whom it may concern:*

Be it known that I, LLOYD JONES, a citizen of the United States, residing at Pittsburgh, Allegheny county, Pennsylvania, have invented a new and useful Improvement in Shear Mechanism, of which the following is a full, clear, and exact description, reference being had to the accompanying drawings, forming part of this specification, in which—

Fig. 3 is a top plan view of the same.

Fig. 4 is a view partly in vertical section and partly in end elevation.

Fig. 5 is a detail view showing in elevation one form of clutch mechanism which may be employed.

Fig. 6 is a plan view showing a modified arrangement of the gearing.

Fig. 7 is a view partly in elevation and partly in section showing such gearing.

Fig. 8 is a diagrammatic view showing the circuit arrangement for the magnets employed in that part of my invention, shown in Figs. 1 to 5, inclusive; and Fig. 9 is a similar diagram showing the circuits for the modification of Figs. 6 and 7.

Fig. 10 is a plan, and Fig. 11 a transverse vertical section of one form of electro-magnetic hold-down device which may be employed.

My invention relates more particularly to shear mechanism, which is designed to take strips of steel wound in coils, straighten the same, cut them into lengths, and then pass the sheared lengths onto a bar piler.

The object of the invention is to provide mechanism of this character which is simple in its construction and mode of operation, and by means of which the pieces may be cut rapidly to very close limits of length.

The nature of my invention will be best understood by reference to the accompanying drawings which will now be described, it being premised, however, that various changes can be made in the details of construction and arrangement of the several parts, without departing from the spirit and scope of my invention, as defined in the appended claims.

Figure 1:
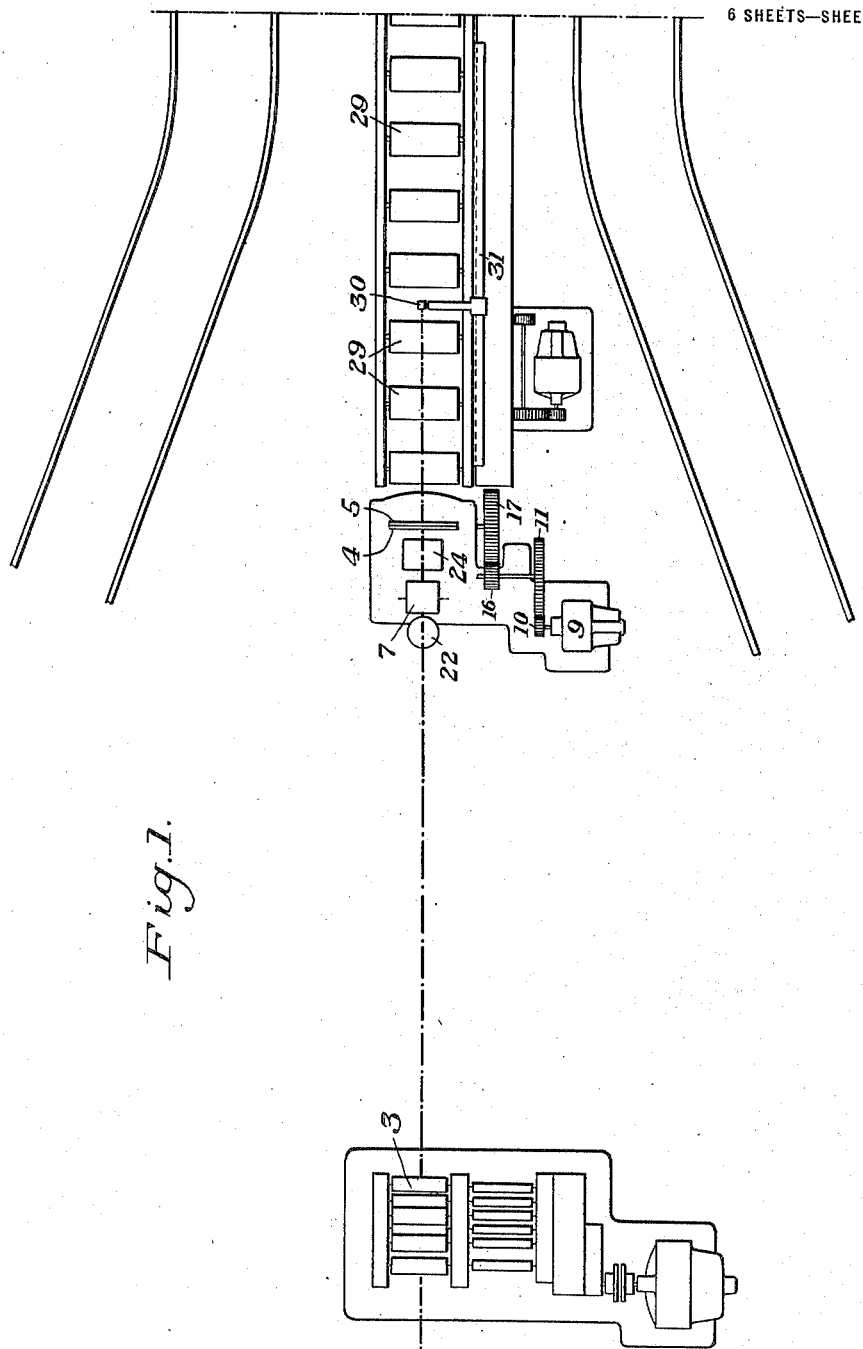
Figure 1 is a diagrammatic plan view of mechanism embodying my invention.
Figure 2:
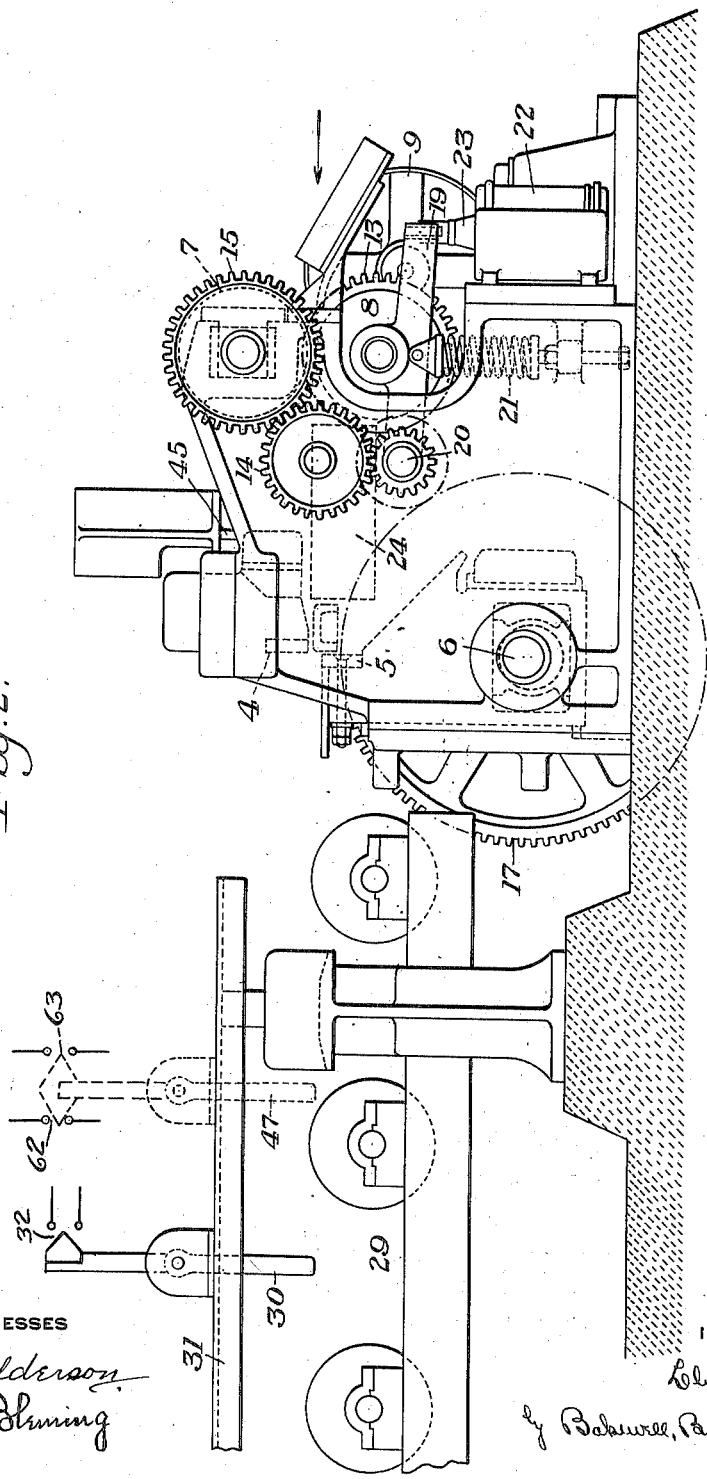
Fig. 2 is a side elevation showing the shear proper and the adjacent parts.

Referring first to that form of my invention shown in Figs. 1 to 5 inclusive, the numeral 2 designates a coil holder of any well-known type and from the coils on which the strips are fed forwardly through a leveling machine 3. This leveling machine may be of any ordinary type and in itself forms no part of the present invention. From this leveling machine the strips are fed to the shear mechanism which will now be described, the leveling machine being placed a sufficient distance in front of the shear so that the steel strips can preferably travel at a uniform rate of speed through the leveling machine while passing through the shear at an intermittent speed, the material bending and looping between the two machines to permit this to be done. The shear proper may be of any suitable character. In the drawing I have shown it as being of the up-cut type, having a fixed upper blade 4, and a reciprocating lower blade 5, the latter being actuated in any usual manner from the shear shaft 6. 7 and 8 designate upper and lower pinch rolls which receive the strip coming forwardly from the leveling machine and carry it through the shears. These rolls are driven from any suitable source of power such as an electric motor 9 whose armature shaft is connected to the shafts of the pinch rolls by the reducing gears 10, 11, 12, 13, 14 and 15. This motor also drives the shear shaft 6 through the pinion 16 and spur gear 17, the latter being loosely mounted on the shaft 6 and arranged to be thrown into and out of driving connection with such shaft by means of the clutch 18.

The lower pinch roll 8 is journaled in a vertically movable yoke 19 (see Figs. 2 and 3), which is pivoted on the shaft 20 which carries some of the gears of the reducing gearing before described.

This yoke is normally supported to hold the two rolls 7 and 8 in operative relation to each other by the adjustable spring 21. It is arranged to be drawn downwardly to separate the two pinch rolls by the action of an electro-magnet 22 of the solenoid type, whose core or plunger is connected to said yoke, as indicated at 23.

24 designates a suitable electro-magnetic hold-down device. Any suitable electro-magnetically actuated or controlled device may be used for this purpose, such device itself forming no part of my present invention. The device shown consists of two hold-down magnets 25 (see Figs. 10 and 11)

over the exposed poles of which the work pieces are fed. 29 designates a feed-out table behind the shear, which is arranged to carry the cut pieces to a bar piler, not shown. 30 designates a pivoted trip arm which hangs over the table 29 and which is longitudinally adjustable on a support 31, the end of this arm being in position to be engaged by the advancing end of the material being sheared. This trip is arranged to control in any suitable manner, such as indicated in Fig. 8, a set of contacts 32 for closing an electric circuit 33 in which are included, in series, the magnet windings 22 and 25 before described, and also a third winding 34 which is employed for controlling the shear clutch 18. This clutch may be of any suitable character and arranged to be controlled in various ways. In the form shown in the drawings, the movable member 18ª of said clutch is engaged with the other member of the clutch by means of a spring 35; and is arranged to be disengaged by the action of a push member 36. This push member is in contact with and arranged to be actuated by a pivoted member 37 (see Figs. 4 and 5) and which is, in turn, actuated by a sliding wedge member 38. The latter is connected by a link 39 with one arm of a lever 40 pivoted at 41, and having connected to its other arm a jointed spring rod device 42 which carries, at its upper end, a latch 43. The plunger 44 of the solenoid magnet 34 has connected thereto a depending rod 45 to which is pivoted a latch 46 which is designed to engage the latch or catch 43.

The operation is as follows: The strip, which is fed at a continuous rate of speed through the leveler, enters between the pinch rolls 7 and 8 and is fed across the hold-down 24, which is at this time not energized. When the forward end of the strip strikes the trip-arm 30, it closes the circuit 33 and at once energizes the magnet coils 22, 25 and 34. The energization of the magnet 22 immediately effects the separation of the pinch rolls and stops further forward movement of the strip. The energization of the coil or coils 25 causes the clamping of the strip to prevent any forward movement thereof; and the energizing of the winding 34 pulls upwardly on the rod 42 and thereby actuates the lever 40 to withdraw the wedge 38 and permit the spring 35 to throw the clutch member 18ª into clutching engagement. The shear now makes one cut and stops, since the upward movement of the rod 45 will trip the latch member 46, and the parts connected to the latch 43 will resume their normal positions. When the winding 34 is deënergized, the latch 46 will again drop into engagement with the latch 43, ready for the next operation. This will occur as soon as the rear end of the piece which has been sheared off has passed the trip 30. By adjusting this trip, the length of the sheared pieces may be varied as may be desired.

In order to permit the strip to be fed through the shear mechanism at a high rate of speed, while at the same time causing the cuts to be accurately made, I employ the modification now to be described. In this modification a second trip arm 47, similar to the trip 30, is placed over the table 29 in the position indicated in dotted lines in Fig. 2. The actuating motor 48 for the pinch rolls is connected to said rolls through an arrangement of gearing such as shown in Figs. 6 and 7, and consisting of the pinion 49 on the armature shaft, the spur gear 50 on a short shaft 51, and the pinion 52 on said shaft meshing with a gear wheel 53 on the shaft 54, which is coupled to the shaft of the lower pinch roll 8ª. The shaft 54 is made in two sections, which are arranged to be connected and disconnected through any suitable clutch such as the electro-magnetic clutch indicated at 55 in Fig. 7. One section of this shaft carries a pinion 56 which meshes with the gear wheel 57 on a shaft 58, which is coupled with the shaft to the upper pinch roll 7ª. The shaft 58 is also formed in two sections connected by a clutch 59, which may be similar to the clutch 55. The sections of the two shafts 54 and 58, which are nearest the pinch rolls, are connected by gears 60 and 61.

When the clutch 55 is energized and clutch 59 is idle, the pinch rolls will be driven through the shaft 54, clutch 55, and gears 60 and 61. When, however, clutch 55 is inactive and clutch 59 is energized, the pinch rolls will be driven through the gears 53, 56, 57, clutch 59, and gears 60 and 61. As will be readily seen, this last named set of gears will give a very much slower speed of rotation to the pinch rolls than will the train of gearing which extends through the clutch 55. To control these clutches, the trip 47 may be arranged to alternately close one set of electric contacts 62 while simultaneously opening the circuit at another set of contacts 63 (see Fig. 9) and vice versa. The operation of this trip is wholly independent of the trip 30 which remains the same as in the form first described. When the piece passing through the machine strikes the trip 47, the high speed clutch is thrown out and the low speed clutch is thrown in. This almost instantly reduces the forward movement of the strip, so that when the latter reaches the trip 30, such movement is sufficiently slow to permit accurate cutting to lengths of numbers of bars from the coils. Normally the trip 47 is in the position to hold the contact 62 closed, thereby keeping the high speed clutch energized.

The advantages of my invention will be apparent to those familiar with mechanism of this class. It provides means whereby the shearing to lengths of a coiled strip may be rapidly and accurately done, without the necessity for manual control of the feed-in and shearing devices.

It will be readily understood that the form of shear, the specific arrangement of the driving gearing for the pinch rolls, and the specific character of the clutches employed, as well as of the means for controlling the operation of such clutches, may be widely varied within the scope of my broader claims. Thus I may, instead of the magnetic clutches indicated in Fig. 7, employ clutch mechanism such as shown in Fig. 5, or any other suitable form of clutch which may be controlled by a trip.

I claim:

1. Shear mechanism of the character described, comprising a pair of feed-in rolls, a hold-down device, a shear, an adjustable trip arranged to be actuated by the work-piece, and means controlled by said trip for controlling the action of the feed-in rolls, the hold-down device and the shear, substantially as described.

2. Shear mechanism of the character described, the combination with a pair of pinch rolls, a support for one of said rolls, whereby it may be moved toward and away from its companion roll, an electro-magnetic hold-down device, a shear, an adjustable trip arranged for contact with the piece being operated upon, and electro-magnetic means controlled by said trip for controlling the position of the movable pinch roll, the action of the hold-down device, and the operation of the shear, substantially as described.

3. In shear mechanism of the character described, the combination of a shear, a pair of pinch rolls for feeding the work-piece to the action of the shear, high speed gearing normally operative to drive the pinch rolls, a lower speed gearing also arranged to drive said rolls, and a trip device arranged for engagement with the work-piece and having connections which when it is engaged by the work-piece, renders the high speed gearing inoperative and makes operative the lower speed gearing, substantially as described.

4. In shear mechanism of the character described, the combination of a shear, a pair of pinch rolls for feeding the work-piece to the action of the shear, high speed gearing normally operative to drive the pinch rolls, a lower speed gearing also arranged to drive said rolls, and a trip device arranged for engagement with the work-piece and having means which when it is engaged by the work-piece, renders the high speed gearing inoperative and makes operative the lower speed gearing, together with a second trip device beyond the first named trip device, and means controlled by the second trip device for entirely stopping the action of said rolls, substantially as described.

5. Shear mechanism of the character described, comprising a shear, a hold-down device, a pair of feed-in rolls, two trains of gearing for driving said rolls at different rates of speed, and trip devices arranged in tandem to be engaged by the work-piece, one of said trip devices having means for controlling, through said gearing, the rate of feed of the pinch rolls, and the other trip device having controlling means for stopping the action of said rolls and for controlling the action of the hold-down device and of the shear, substantially as described.

In testimony whereof, I have hereunto set my hand.

LLOYD JONES.